United States Patent
Sudhakar et al.

(10) Patent No.: US 9,563,640 B2
(45) Date of Patent: Feb. 7, 2017

(54) TECHNIQUES FOR VERSIONING FILES (75) Inventors: Gosukonda Naga Venkata Satya Sudhakar, Bangalore (IN); Anirban Bhattacharjee, Jamshdpur (IN)

(73) Assignee: Micro Focus Software Inc., Wilmington, DE (US)

( * ) Notice: Subject to any disclaimer, the term of this patent is extended or adjusted under 35 U.S.C. 154(b) by 911 days.

(21) Appl. No.: 11/973,114

(22) Filed: Oct. 5, 2007

(65) Prior Publication Data

US 2008/0195677 A1 Aug. 14, 2008

(30) Foreign Application Priority Data

Feb. 9, 2007 (IN) .............................. 269/DEL/2007

(51) Int. Cl.
*G06F 17/30* (2006.01)

(52) U.S. Cl.
CPC ..... *G06F 17/3023* (2013.01); *G06F 17/30088* (2013.01); *G06F 17/30575* (2013.01)

(58) Field of Classification Search
CPC ...................... G06F 17/30088; G06F 17/30575
USPC .................................. 707/639, 695, 697, 699
See application file for complete search history.

(56) References Cited

U.S. PATENT DOCUMENTS

| | | | |
|---|---|---|---|
| 5,278,979 A * | 1/1994 | Foster et al. | |
| 5,574,906 A | 11/1996 | Morris | |
| 5,623,661 A * | 4/1997 | Hon | |
| 5,634,052 A * | 5/1997 | Morris | 707/640 |
| 5,729,743 A * | 3/1998 | Squibb | |
| 5,761,677 A | 6/1998 | Senator et al. | |
| 5,778,395 A | 7/1998 | Whiting et al. | |
| 5,832,514 A * | 11/1998 | Norin et al. | |
| 5,919,247 A | 7/1999 | Van Hoff et al. | |
| 6,052,531 A | 4/2000 | Waldin, Jr. et al. | |
| 6,195,796 B1 * | 2/2001 | Porter | G06F 8/71 707/999.202 |
| 6,233,589 B1 * | 5/2001 | Balcha et al. | 707/625 |
| 6,460,052 B1 * | 10/2002 | Thomas et al. | 707/695 |
| 6,532,588 B1 * | 3/2003 | Porter | G06F 8/61 707/999.202 |
| 6,647,399 B2 | 11/2003 | Zaremba | |
| 7,134,041 B2 * | 11/2006 | Murray et al. | 714/4.1 |
| 7,158,991 B2 * | 1/2007 | Kekre et al. | |
| 7,243,103 B2 * | 7/2007 | Murphy et al. | |
| 7,293,027 B2 * | 11/2007 | Margolus | |
| 7,392,324 B2 * | 6/2008 | Cardone et al. | 709/238 |
| 7,487,190 B2 * | 2/2009 | Black et al. | |
| 7,987,157 B1 * | 7/2011 | Hsiung et al. | 707/649 |
| 2002/0147733 A1 * | 10/2002 | Gold et al. | 707/200 |

(Continued)

OTHER PUBLICATIONS

"Archive and Compliance Solutions", http://www.netapp.com/solutions/archive-compliance.html, Network Appliance, Inc.,(2007).

(Continued)

*Primary Examiner* — Mark E Hershley
(74) *Attorney, Agent, or Firm* — Schwegman Lundberg & Woessner, P.A.

(57) ABSTRACT

Techniques are presented for versioning files. Base files are acquired for files on a primary volume. At configurable points in time changes to the files are noted on different volumes, these changes are represented as deltas. The deltas are stored on an archive volume and represent versions and a version history for the files.

13 Claims, 3 Drawing Sheets

(56) References Cited

U.S. PATENT DOCUMENTS

| | | | |
|---|---|---|---|
| 2002/0169740 A1* | 11/2002 | Korn | 707/1 |
| 2003/0074376 A1 | 4/2003 | Benayoun et al. | |
| 2003/0220944 A1* | 11/2003 | Lyman Schottland et al. | 707/203 |
| 2004/0031027 A1* | 2/2004 | Hiltgen | 717/170 |
| 2005/0010607 A1* | 1/2005 | Parker et al. | 707/200 |
| 2005/0022175 A1* | 1/2005 | Sliger | G06F 8/68 717/169 |
| 2005/0091291 A1* | 4/2005 | Kaler et al. | 707/203 |
| 2006/0064416 A1* | 3/2006 | Sim-Tang | 707/6 |
| 2007/0011205 A1* | 1/2007 | Majjasie et al. | 707/104.1 |
| 2007/0011211 A1* | 1/2007 | Reeves et al. | 707/203 |

OTHER PUBLICATIONS

"Enterprise Volume Management System", http://evms.sourceforge.net/, (2006).

"LVM2 Resource Page", http://sources.redhat.com/lvm2/, (2007).

* cited by examiner

TECHNIQUES FOR VERSIONING FILES

RELATED APPLICATIONS

The present application claims priority to India Patent Application No. 269/DEL/2007 filed in the India Patent Office on Feb. 9, 2007 and entitled "TECHNIQUES FOR VERSIONING FILES"; the disclosure of which is incorporated by reference herein.

FIELD

The invention relates generally to data processing and more particularly to techniques for versioning files.

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To this, the enterprises have to implement a variety of data replication, data backup, and data versioning techniques against their data models or their data warehouses.

For example, an enterprise may periodically capture the state of its data for a particular volume as a snapshot. If something should happen to the volume, it can be completely restored to the saved snapshot state. Another technique mirrors a volume on multiple volumes, such that if one volume is down or not accessible, another volume is automatically made available unbeknownst to the users. This is often referred to as data replication or failover support.

In still more cases, an enterprise may desire to permit different versions of files in the data warehouse to be captured, archived, and restored on demand by a user. This may be useful for a variety of reasons. For example, a user may download a file and work with it offline and could then lose the file due to a hardware failure. In another case, a user may make changes to a file and then determine that a previous version was more acceptable or more desirable. In either case, if the files are versioned, the user can retrieve a desired version of a file from an archive or versioning volume.

Versioning or archive services typically store an entire file, even if only a single byte of information is changed between versions of the file. This is obviously not very space efficient and is also not very processor efficient, since the processor has to access, store, index, and retrieve the entire file for each version of the file being retained in the archive volume.

Snapshot services work on the block level of data granularity for a particular volume and do not typically permit changes to a saved snapshot. Versioning services typically work on the file level of data granularity and do permit changes. Snapshots are typically replaced every so often with newer snapshots. Versioned files may never be written over or replaced and can be potentially maintained indefinitely on separate storage associated with the archive volume. In some cases, U.S. government regulations now mandate that certain enterprises have adequate data backup and versioning systems in place. However, backup and versioning services can be expensive to maintain and to manage.

SUMMARY

In various embodiments, techniques are provided for versioning files. More particularly and in an embodiment, a method is provided for versioning files. A base file is obtained at a first time and changes made to the base file are captured at a second time. The changes are noted as a delta, and the delta reflects differences between the base file and the changes. Next, the delta is stored as a newer version of the base file in versioning or archive storage.

DETAILED DESCRIPTION

A "base file" represents a complete copy of a data file. In other words, each byte of information that is represented in the data file is presented in the base file. The base file represents an "initial state" of the data file from which subsequent versions are to be derived or taken. In a sense, a base file is an initial or first version of a particular data file. The base file is a checkpoint in time in which data for the file is measured against or in which versions are taken from.

As used herein, a "delta" refers to one or more differences that are recorded in a normalized format to represent the progression of a previous state of a data file to a current version of the data file. So, a delta is a data structure or type of file that includes information and instructions that can be applied to a base file or on a result of a merged base file and previously applied deltas; when multiple deltas are present they are applied serially in a defined order to achieve a particular version of the data file. As an example, if a base file has two versions, its initial base file version and a current version, the current version may be represented as a delta and may include strings of data to insert or delete along with the respective insertion or deletion commands to delete strings of data from the base file and strings of data to insert into the base file. The smaller delta is applied against the base file to achieve a current version of the base file. In another example, the base file may have three versions, its initial base file version, a subsequent version, and a current version. Both the subsequent version and the current version may be represented as deltas. To arrive at the current version, the subsequent delta is first applied against the base file to acquire an intermediate version and then the current delta is applied against the intermediate version to arrive at the current version. So, a string of different deltas may be serially applied against the base file to arrive at a particular desired version.

According to an embodiment, the technique for representing and applying deltas for and against base files uses the delta signature techniques presented in U.S. Pat. No. 6,233,589, commonly assigned to Novell, Inc. of Provo, Utah; the disclosure of which is incorporated by reference herein.

In fact, any technique that represents differences between two different versions of a file in a delta format and that can apply the deltas to acquire a particular desired version of the file, may be enhanced to incorporate the teachings presented herein.

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

Figure 1:
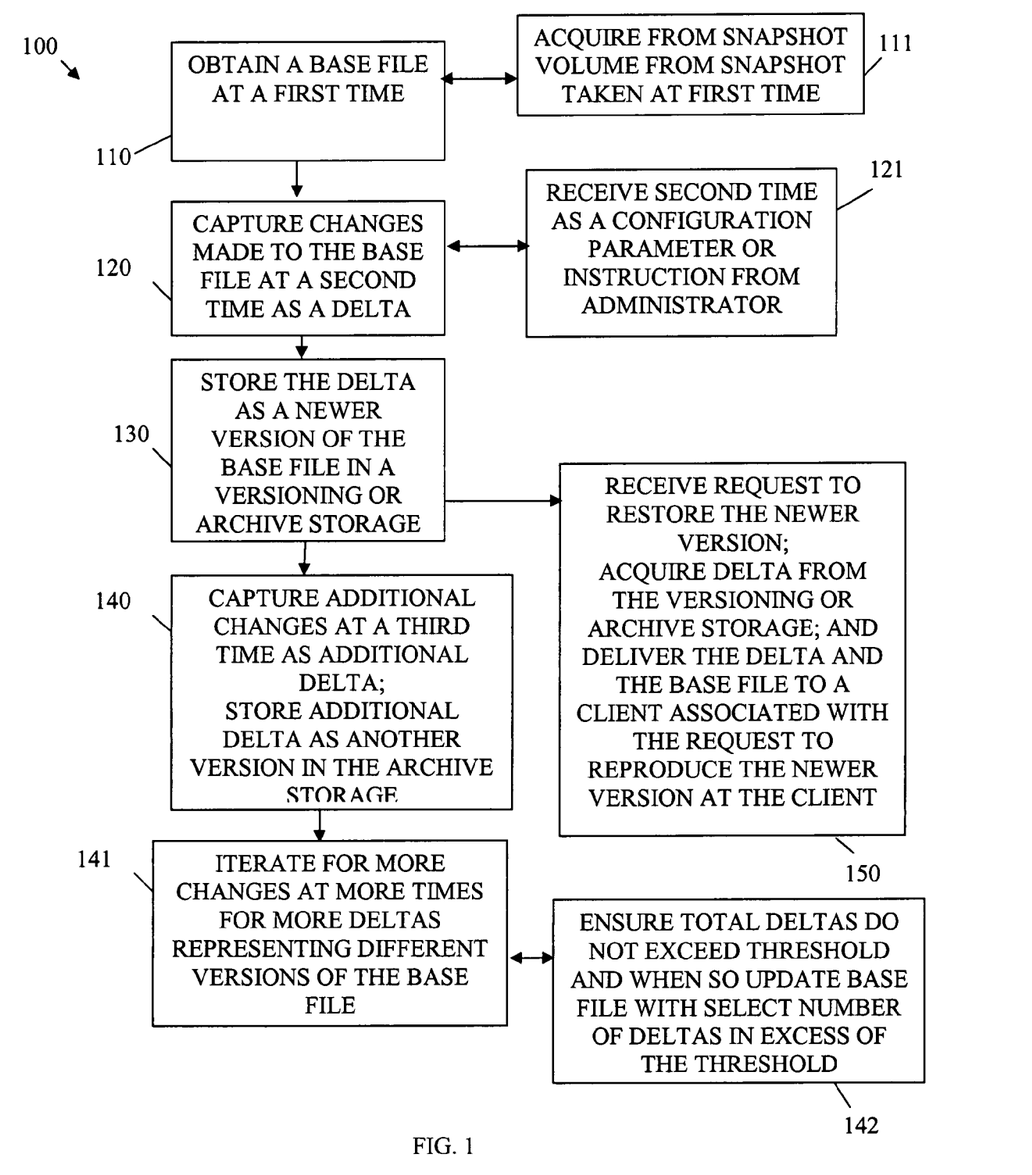
FIG. 1 is a diagram of a method for versioning files, according to an example embodiment.

FIG. 1 is a diagram of a method 100 for versioning files, according to an example embodiment. The method 100 (hereinafter "versioning service") is implemented in a machine-accessible and machine-readable medium and is accessible over a network. The network may be wired, wireless, or a combination of wired and wireless.

The versioning service may be implemented on a host server that maintains one or more primary volumes for files of users. The users operate off of clients networked to the host server. The host server also communicates with a snapshot volume and a versioning or archive service and volume. The snapshot volume houses snapshots of the primary volume and the versioning or archive volume house versions of selective or all files associated with the primary volume.

It is within this context that the processing of the versioning service is now discussed with reference to the FIG. 1.

At 110, the versioning service obtains a base file at a first time. The first time may be viewed as an epoch or a period within which measurements or intervals are to occur. At the beginning of the epoch, a snapshot of a primary volume may be taken. Thus, in an embodiment, at 111, the base file may be obtained from a snapshot volume, where that base file was recorded within the snapshot volume during a snapshot operation that occurred at the beginning of the epoch or first time. The first time may be defined by policy, manually defined, or defined by events. For example, a policy may define that a base file is to be taken when a file is initially created, that a base file is to be taken when instructed to do so by an administrator or that a base file is to be taken when a new snapshot (event) is detected.

At 120, the versioning service captures changes made to the base file at a second time or interval. The changes are noted as a delta file or data structure between the file associated with a first snapshot and the file associated with the new or second snapshot. According to an embodiment, the delta is defined as one or more signatures such as is defined in U.S. Pat. No. 6,233,589, commonly assigned to Novell, Inc. of Provo, Utah; and the disclosure of which is incorporated by reference herein. The delta details changes that have to take place against the base file to arrive at a newer version of the base file. For example, the delta may include a statement that says delete bytes 3-8 and add "GNVS" in bytes 3-6. The delta is typically much smaller than the base file and includes data (e.g., "GNVS") or instructions (e.g., "delete bytes or add bytes") that when processed against the base file can produce a newer version of the base file.

According to an embodiment, at 122, the versioning service may also receive the second time for which the changes are to be noted as a configuration parameter or as an instruction received from an administrator. So, the interval during which changes are noted may be user or administrator defined. Thus, every 5 minutes the versioning service may take note of changes occurring to the file and at each 5 minute interval record a new delta. It is understood that 5 minutes is but one example as it could be even 5 hours or any other desired and configured period or interval. Each delta representing a different version for the base file.

At 130, the versioning service stores the delta as a newer version of the base file in a versioning or archive storage or volume. Thus, the archive volume includes deltas that represent the versions of the files and a file version history and does not include entire copies of files with slight changes or modifications. This saves a considerable amount of storage space in the archive volume and is more processor efficient, since the archive server that maintains the archive volume does not have to index, store, retrieve and process entire files for a new version; rather a delta is used to reflect a particular version.

In an embodiment, at 140, the versioning service may also capture additional changes made to the newer version (represented by the file in the latest snapshot) at a third time (or new interval). These additional changes are also represented as an additional delta. The additional delta reflects differences between the newer version and the additional changes. The additional delta is then also stored in the versioning or archive storage or volume as yet another version of the newer version.

In fact, at 141, the versioning service may iterate the processing for yet more changes at more times (or intervals) to capture still more deltas. Each new delta represents a different version of the base file and each delta is stored in the versioning or the archive storage.

There are also other situations that can occur. As an example, consider that if a base file F-0, at time T-O, is taken from a snapshot S-0, then after some time the difference between F-0 as it now exist in S-1 (new snapshot) as F-1 at time T-1 is stored as delta D-0; similarly, the difference between file F-O as it now exists in S-2 (third snapshot) as F-3 at time T-2 is stored as Delta D-1. Suppose for this example this processing continues for 10 deltas up to D-9 (D-0 through D-9 is 10 deltas). There are now also 11 snapshots, the eleventh snapshot being S-10. Suppose further that most if not all of the first 10 snapshots (S-0 through S-9) are deleted after time T-10 (sometime after the time S-10 was taken). Now suppose the user wants to retrieve the $10^{th}$ version of the file F-0 associated with the $10^{th}$ snapshot and identified as D-8 (since in the example the deltas began at D-0). To do this, the user or client gets a copy of F-O (F-10) as it exists in its D-9 state from the S-10, the file F-0 in its D-9 state represents a new Base, let's call it F-10. D-8 can then be applied to F-10 in a reversible manner to achieve F-9, F-O as it appeared in the tenth snapshot S-9. The deltas D-0 through D-9 are stored on the archive volume or server. This is an alternative to applying D-0 though D-8 to get to the D-9 state of F-0. Essentially, the very last version of F-0 can be retained in the latest snapshot and the desired version acquired by reverse applying the proper sequence of deltas beginning with the latest delta and working back to the desired version. The processing associated with reversing deltas depends on the file difference technique used to initially create the delta. Some techniques may require slight modification for this alternative approach to be used such that deleted data in prior file versions is actually retained in the deltas as deleted substrings. So, a command instruction of "delete bytes 3-6" in a delta would be insufficient if the approach above is used where the command instruction should be modified in the delta to say delete "GNVS" from bytes 3-6. Now, any deleted data is retained in the deltas and thus capable of being reversibly applied to the and only the latest snapshot version of the file is needed to reconstruct any prior version of the file, which can be done by reversely applying deltas to arrive at the desired and prior file version.

In essence, the deltas are each applied in a descending serial order against a latest version of the file in a reversible manner to acquire a desired prior version of the file.

Still another approach may be used for delta creation. In this particular approach no snapshot feature is used at all. For each file that has to be versioned an initial base file is generated and maintained on a host server. A copy of that base file is also retained on a versioning volume or server. At every epoch (interval for which a version is to be noted against the base file and which is configured by an administrator) a recent version of the file is noted on the host server. A delta is taken between the recent version and the base version. The delta is sent to the versioning server and the host discards the original base file and uses the recent version as the new base version. Since the versioning server has the original base version and the deltas any desired version for the file can be reconstructed. Moreover, similar to what was discussed above if reversible deltas are used the versioning server could also replace the original base version with the latest version and keep it as a new base, then to arrive at earlier versions of the file the deltas are applied in a reverse manner against the latest version being kept as the base version.

It is now clear that a variety of configuration options exists as to where the base file is stored or retrieved and as to what it represents. The deltas provide the ability to use any version of the file (being used as a base version) to achieve a desired prior or even subsequent version of that file (assuming deltas are reverse compatible as described above).

In some cases, at 142, the versioning service may ensure that the total number of deltas does not exceed some threshold value or number. For example, policy associated with the file may dictate that just the 5 most recent versions of the file be maintained in the archive volume. Thus, just 4 deltas representing versions 2-5 are housed in the archive volume. If the deltas exceed 4, then the number of deltas that exceed 4 may be applied against the base file to update the base file and ensure that a desired number of versions is retained. In other words, the first recorded deltas are applied to the base file to update the base file and are then removed from the archive volume; the total number of deltas is then maintained according to policy at a threshold number. So, if deltas d1, d2, d3, d4, d5, d6 are noted and policy dictates that just the last 5 deltas are to be maintained, then d1 is applied against the base file to get a new version of the base file. Then d2-d6 are updated as d1-d5 to conform with policy of maintaining just 5 deltas.

In an embodiment, at 150, the versioning service may subsequently receive a request to restore the newer version of the base file. To do this, the delta is acquired from the versioning and archive storage or volume and the delta and the base file delivered to the client associated with the request. The client may then independently reproduce the newer version at the client. This can assist in decreasing the processing load associated with the archive and host servers in reproducing and delivering desired versions of files to clients, because the actual deltas are applied to the base file at the client.

It is noted, that it does not always have to be the case that the client applies its own deltas against the base file to achieve a desired version of the file. That is, the versioning service may perform this on behalf of the client in situations where processing load makes it permissible or where policy dictates.

In some embodiments, the versioning service may also detect when certain types of files are compressed. In such situations, the files may be uncompressed and the deltas taken and then re-compressed again. The deltas may then be stored in the archive volume in compressed or uncompressed formats. Otherwise if the compression format is delta friendly (e.g., rsync friendly gzip and bzip2), then decompressing does not have to occur.

Figure 2:
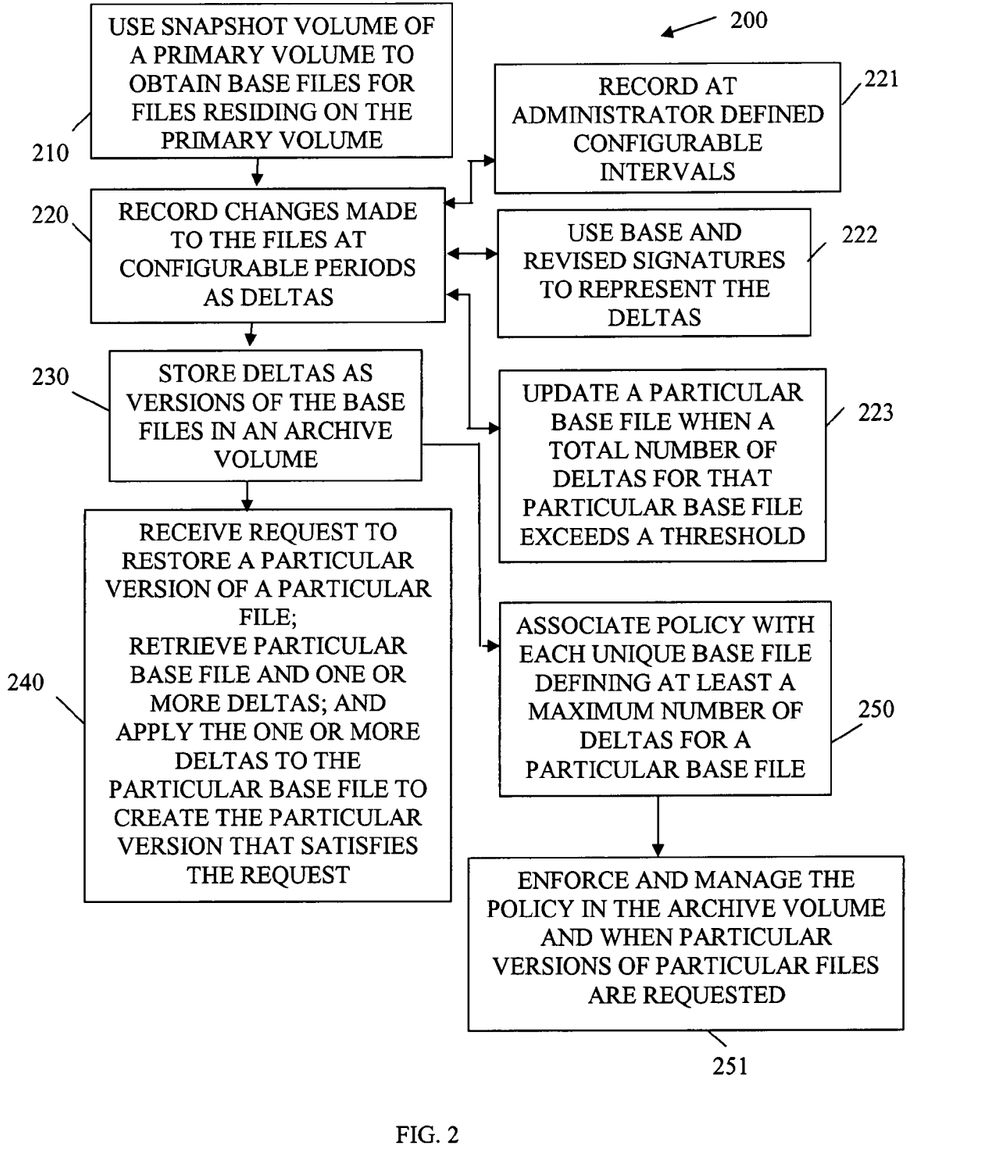
FIG. 2 is a diagram of a method for versioning files, according to an example embodiment.

FIG. 2 is a diagram of a method for versioning files, according to an example embodiment. The method 200 (hereinafter "file versioning service") is implemented in a machine-accessible and readable medium and is accessible over a network. The network may be wired, wireless, or a combination of wired and wireless. The file versioning service presents an alternative perspective to the versioning service represented by the method 100 of the FIG. 1 and in some cases an enhanced perspective.

At 210, the file versioning service uses a snapshot volume of a primary volume to obtain base files for files residing on the primary volume. That is, the base files are base lined from a snapshot volume at a particular point in time. If the snapshot is maintained, then the base files may remain in the snapshot and do not have to necessarily be copied out to an archive volume for storage. So, the base files may be dynamically acquired when needed from the snapshot volume from which they derive. Although, this does not have to always be the case, as the initial base files may be extracted once from the snapshot and then maintained as base files within the archive volume.

At 220, the file versioning service records changes made to the files at configurable periods as deltas. The changes are represented as instructions or information that when applied to the base files in a defined order (if multiple deltas are being applied) produces a particular version of the files.

According to an embodiment, at 221, the file versioning service may record the deltas at administrator defined configurable intervals. For example, an administrator may determine that all files are to be check pointed or versioned at defined intervals. It may also be that specific file types or specific files may have their own policy that drives the configurable interval within which they are check pointed and deltas generated. The configurable period may be for all files, for specific file types, or customized for specific files. Each file or set of files may have different configurable periods for creating deltas.

In an embodiment, at 222, the file versioning service may generate and use deltas as base and revised signatures to represent the deltas vis-à-vis the base files from which they depend. Examples for doing this are presented in U.S. Pat. No. 6,233,589, commonly assigned to Novell, Inc. of Provo Utah; the disclosure of which is incorporated by reference herein.

Additionally, in some cases, at 223, the file versioning service may update a particular base file when a total number of deltas for that particular base file exceed a threshold. Examples of this were discussed above in detail with reference to the versioning service represented by the method 100 of the FIG. 1. All the files being versioned may have a common threshold number representing a maximum number of deltas or permissible versions to retain in the archive volume. Alternatively, selective groupings or individual files may have their own unique and independent threshold values representing a maximum number of deltas or permissible versions to retain in the archive volume for just those groupings or individual files.

At 230, the file versioning service stores the deltas as versions of the base files in an archive volume. The whole files are not stored; rather the deltas are stored and retained in the archive volume. The deltas can be applied to the base files in defined orders to arrive at a desired version.

In an embodiment, at 240, in still another scenario, the file versioning service may receive a request to restore a particular version of a particular file. If the versioning service is administered to retrieve the version also in backward direction, the file versioning service may retrieve the base file from the last snapshot. Then the deltas retrieved in a backward direction can be applied in a reversed manner to represent the desired version being requested. So, if there were 10 versions of a base file and a user requested version 8, the file (version 10) can be retrieved from the last snapshot, which is taken as the base file. Then the last delta (version 9) and a second to last delta (version 8) are all retrieved from the archive volume and applied to the retrieved base file serially in the order of retrieval (descending) to produce the desired version of the file being requested. Visibly, this gives a better performance than retrieving the base file with 8 deltas from the archive volume and applying them in an ascending serial order. Thus, the reversible delta can considerably reduce processing in the versioning service when a large number of versions are being maintained. This helps optimize the network traffic when the versioning service and the volume are connected through the network. Moreover, since the reversible delta can be used in tandem by the versioning service both in a forward and backward direction, it gives a most optimized result in terms of processing and network bandwidth consumption, because just the deltas that are needed are sent and applied over the network. However, it is understood that the serial ascending order may also be used. So, if there were 5 versions of a base file and a user requested version 3, then the base file (version 1), and a first delta (version 2) and a second delta (version 3) are all retrieved from the archive volume. Then, the first delta is applied against the base file to achieve an intermediate version and the second delta is applied against the intermediate version to produce the desired version 3 of the file. Appropriate selection of the deltas and application of the deltas against the base file produces the desired version of the file being requested.

According to an embodiment, at 250, the file versioning service may also associate policy with each unique base file. The policy may at least define a maximum number of deltas for a particular base file. The policy may be applied at the file level of granularity and may include a variety of processing instructions. Thus, at 251, the file versioning service may enforce and manage the policy in the archive volume and also when particular versions of particular files are being requested. So, policy may drive processing of the file versioning service to perform unique actions when particular versions of the files are being restored. The actions can include a variety of things such as authentication, notification, and the like.

Figure 3:
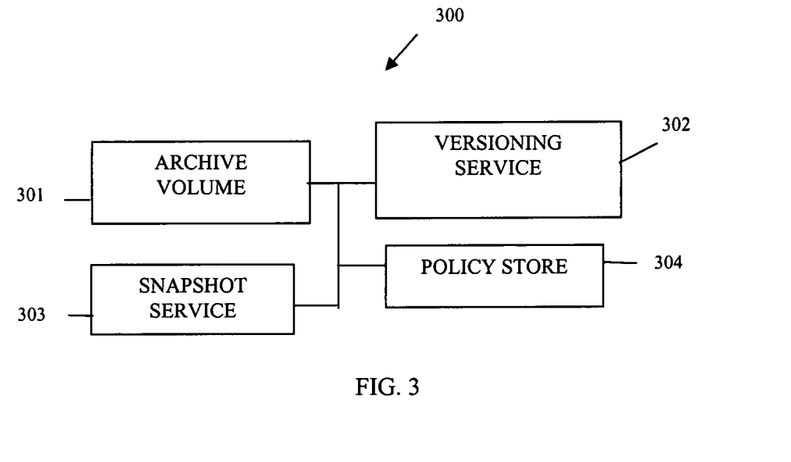
FIG. 3 is a diagram of a file versioning system, according to an example embodiment.

FIG. 3 is a diagram of a file versioning system 300, according to an example embodiment. The file versioning system 300 is implemented in a machine-accessible and readable medium and is accessible over a network. The network may be wired, wireless, or a combination of wired and wireless. In an embodiment, the file versioning system 300 implements, among other things, various aspects of the methods 100 and 200 of the FIGS. 1 and 2, respectively.

The file versioning system 300 includes an archive volume 301 and a versioning service 302. The file versioning system 300 may also include a snapshot service 303 and/or a policy store 304. Each of these and their interactions with one another will now be discussed in turn.

The archive volume 301 includes one or more deltas for each file being versioned. The archive volume 301 may also include a base file for each file being versioned; although this does not have to always be the case. The archive volume 301 is managed by a versioning server or archive server. The contents and history of versions for files may be viewed by clients and accessed via the versioning service 302.

The versioning service 302 acquires base files for files associated with a primary volume and is to create versions of the base files as deltas. The deltas are stored in the archive volume 301. Example processing associated with the versioning service 301 was discussed in detail above with reference to the methods 100 and 200 of the FIGS. 1 and 2, respectively.

According to an embodiment, the versioning service 302 may acquire the base files at configurable points in time and is to generate the deltas representing the versions of the base files at configurable intervals between the configurable points in time. The versioning service 302 may also maintain a maximum number of deltas for each of the base files or for all of the base files collectively as a whole.

The versioning service 302 may also supply one or more of the deltas and its corresponding base file to a client so that the client can independently reproduce a particular version at the client. In other cases, the versioning service 302 may apply the one or more deltas against its corresponding base file and then supply the result as a particular version of a particular file to the client. So, the versioning service 302 may provide the means for the client to reproduce the correct version of a file via the base file and the deltas or the versioning service 302 may supply the reproduced version to the client.

In an embodiment, the file versioning system 300 may also include a snapshot service 303. The snapshot service 303 takes snapshots of the primary volume. The versioning service 302 may then acquire the base files from the snapshots. This ensures that at least the last snapshot taken is available to calculate the delta of a file in any point in time. Deltas can be applied reversibly to the last taken snapshot in a descending manner to achieve a prior version of the base files. In other cases, earlier retained snapshots may be used and deltas applied in an ascending manner to arrive at a desired version of the base files.

In another embodiment, the file versioning system 300 may include a policy store 304. The policy store 304 identifies policy for versioning at the file level of detail for each of the base files. The policy is acquired by the versioning service 302 and enforced during the versioning process or when a client requests a particular version.

Figure 4:
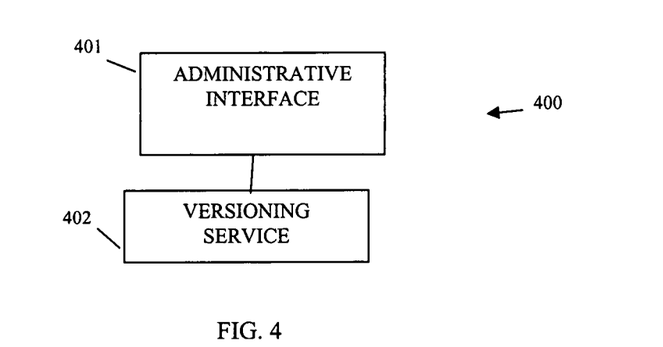
FIG. 4 is a diagram of another file versioning system, according to an example embodiment.

FIG. 4 is a diagram of another file versioning system 400, according to an example embodiment. The file versioning system 400 is implemented in a machine-accessible and readable medium is accessible over a network. The network may be wired, wireless, or a combination of wired and wireless. In an embodiment, the file versioning system 400 implements various aspects associated with the methods 100 and 200 of the FIGS. 1 and 2, respectively, and the system 300 of the FIG. 3.

The file versioning system 400 includes an administrative interface service 401 and a versioning service 402. Each of these and their interactions with one another will now be discussed in detail.

The administrative interface 401 permits an administrator or a user to interact with and define processing directives or preferences to the versioning service 402 for versioning files. One example is when an administrator uses the administrative interface 401 to define for the versioning service 402 a period of time after which files are versioned. The administrative interface 401 may also be used to define where and how the base files are to be obtained and when new base files are to be generated.

The administrative interface 301 may also permit the administrator to associate and define policy that is associated with versioning at a file-level of granularity. That is, policy may be maintained, defined, enforced, and managed, at the file level of granularity. Policy may also be associated with selective groupings of files or with specific file types. Additionally, policy may be associated with all of the files on a global level. Thus, the policy may be hierarchical in nature some being local and specific to specific files and others being generic and specific to groupings or the entire set of files as a whole.

The versioning service 402 versions the files from base files and does this by producing deltas. The deltas are stored in an archive volume for subsequent access by users or clients. Detailed examples of the processing associated with the versioning service 402 were presented above with reference to the methods 100, 200 and the system 300 of the FIGS. 1-3, respectively.

The versioning service 402 may in some cases reside on a host server that houses the files for clients of a network. The deltas are sent to an archive server to be stored as version in the archive volume. In this manner, the archive server is not burdened with delta processing and simply maintains and stores deltas for files as versions in the archive volume. Policy may be enforced as the deltas are stored in the archive volume, as discussed above.

In some cases, the versioning service 402 may produce a particular version on demand by acquiring selective deltas representing the particular version from the archive volume and by acquiring the base file associated with the particular version. The deltas are then applied against the base file to produce the desired particular version. Alternatively, the versioning service 402 may send the base file and the deltas to the client for the client to independently apply the deltas to produce the desired version of the file.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

obtaining a base file at a first time, the base file is a complete copy of a data obtained as a checkpoint in time for the data and the base file is used for deriving subsequent versions of the data, wherein obtaining further includes dynamically acquiring the base file from a snapshot volume, wherein the base file is recorded within the snapshot volume during a snapshot operation taken at the first time of a primary volume, wherein the snapshot is of the primary volume and includes the data;

capturing changes made to the base file at a second time as a delta, the delta reflects differences between the base file and the changes, the delta represented as information and instructions in a serialized format, the delta is a progression from a previous state of the base file to a newer version of the base file and the delta includes strings of data to insert or delete from the base file along with insertion or deletion commands to insert the strings or to delete the strings, and wherein the delta stores with each delete command a corresponding string of the data that was deleted without having to use an index for locating the data that was deleted;

storing, the delta as the newer version of the base file in an archive storage, wherein the archive storage does not include a copy of the base file, and the base file is dynamically acquired when needed from the snapshot volume, and the base file is at least represented at any given point in time as three versions: a base file version stored as the complete copy of the data in the snapshot volume, a subsequent version derived from the base file version and stored as a subsequent delta in the archive storage, and a current version derived from the subsequent version and the base file version and the current version stored as a current delta in the archive storage, any particular version of the base file obtained by serially applying retained deltas as a progression to reach that particular version; and processing, by the archive storage, a particular delta for generating a particular new version of the base file without indexing, storing, retrieving, and processing from the archive storage entire copies of any specific files derived from the base file.

2. The method of claim 1 further comprising:

capturing additional changes made to the newer version at a third time as an additional delta; and storing the additional delta as a representation of the newer version in the archive or storage.

3. The method of claim 2 further comprising, iterating the processing for yet more changes at more times to capture more deltas, where each delta represents a different version of the base file and storing each delta in the archive storage.

4. The method of claim 3 further comprising:

ensuring that a total number of deltas does not exceed a threshold; and updating the base file to include application of a select number of the deltas when the total number of deltas exceeds the threshold, wherein the select number of the deltas is equal to an excess above the threshold.

5. The method of claim 1, wherein capturing further includes receiving the second time as a configuration parameter or as an instruction from an administrator.

6. The method of claim 1 further comprising:

receive a request to restore the newer version of the base file;

acquiring the delta from the archive storage; and delivering the delta and the base file to deliver to a client associated with the request to reproduce the newer version at the client.

7. A method, comprising:

using a snapshot volume of a primary volume for dynamically obtaining base files for files residing on the primary volume from that snapshot volume, and wherein each base file is recorded within the snapshot volume during a snapshot operation taken at the first time of a primary volume that includes the files;

recoding changes, which are noted on the primary volume, and which are made to the files at configurable periods, the changes are represented as deltas that are defined as signatures; and storing the deltas as versions of the base files in an archive volume and just the deltas are stored and not whole files and not the base files, each delta applied serially forward against a particular base file to arrive at a particular subsequent version for that particular base file and each delta applied in a reverse fashion from that particular base file to arrive at a particular earlier version of that particular base file, multiple deltas are serially applied in a forward progression against one another beginning with a first delta to arrive at a particular version for the particular base file that is subsequent to when that particular base file was obtained and the multiple deltas applied in a reversion progression against one another beginning with a last delta to arrive at any given version that precedes a current version, the archive volume also includes specific deltas and a file version history for the base file but does not include entire copies of specific files derived from a specific base file, and the archive volume does not index, store, retrieve, and process entire files from the archive volume for any particular new version but instead processes the particular delta to generate the particular new version using a particular dynamically acquired base file from the snapshot volume and the dynamically acquired base file dynamically acquired when needed from the snapshot volume, and wherein each delta file stores with any delete command instruction a corresponding string that was deleted by the delete command without having to use an index for locating the corresponding string.

8. The method of claim 7, wherein receiving further includes:

receiving a request to restore a particular version for a particular file;

retrieving a particular base file associated with the particular file and one or more of the deltas that reflect the particular version being requested; and applying the one or more deltas to the particular base file to create the particular version that satisfies the request.

9. The method of claim 7, wherein recording changes further includes using a base signatures for the base files and revised signatures to reflect the changes to the base files.

10. The method of claim 7, wherein recoding changes further includes updating a particular base file when a total number of deltas for that particular base file exceeds a threshold number.

11. The method of claim 7, wherein recording changes further includes recording the changes at configurable intervals defined by an administrator.

12. The method of claim 7 further comprising, associating policy with each unique base file, wherein the policy at least defines a maximum number of deltas for a particular base file to which it relates.

13. The method of claim 12 further comprising, enforcing and managing the policy in the archive volume and when particular versions of particular files are requested.

* * * * *

UNITED STATES PATENT AND TRADEMARK OFFICE
CERTIFICATE OF CORRECTION

PATENT NO. : 9,563,640 B2  
APPLICATION NO. : 11/973114  
DATED : February 7, 2017  
INVENTOR(S) : Sudhakar et al.

Page 1 of 1

It is certified that error appears in the above-identified patent and that said Letters Patent is hereby corrected as shown below:

In the Claims

In Column 10, Line 26, in Claim 1, delete "storing," and insert --storing-- therefor Signed and Sealed this
Fourth Day of June, 2019

Andrei Iancu
*Director of the United States Patent and Trademark Office*